UNITED STATES PATENT OFFICE.

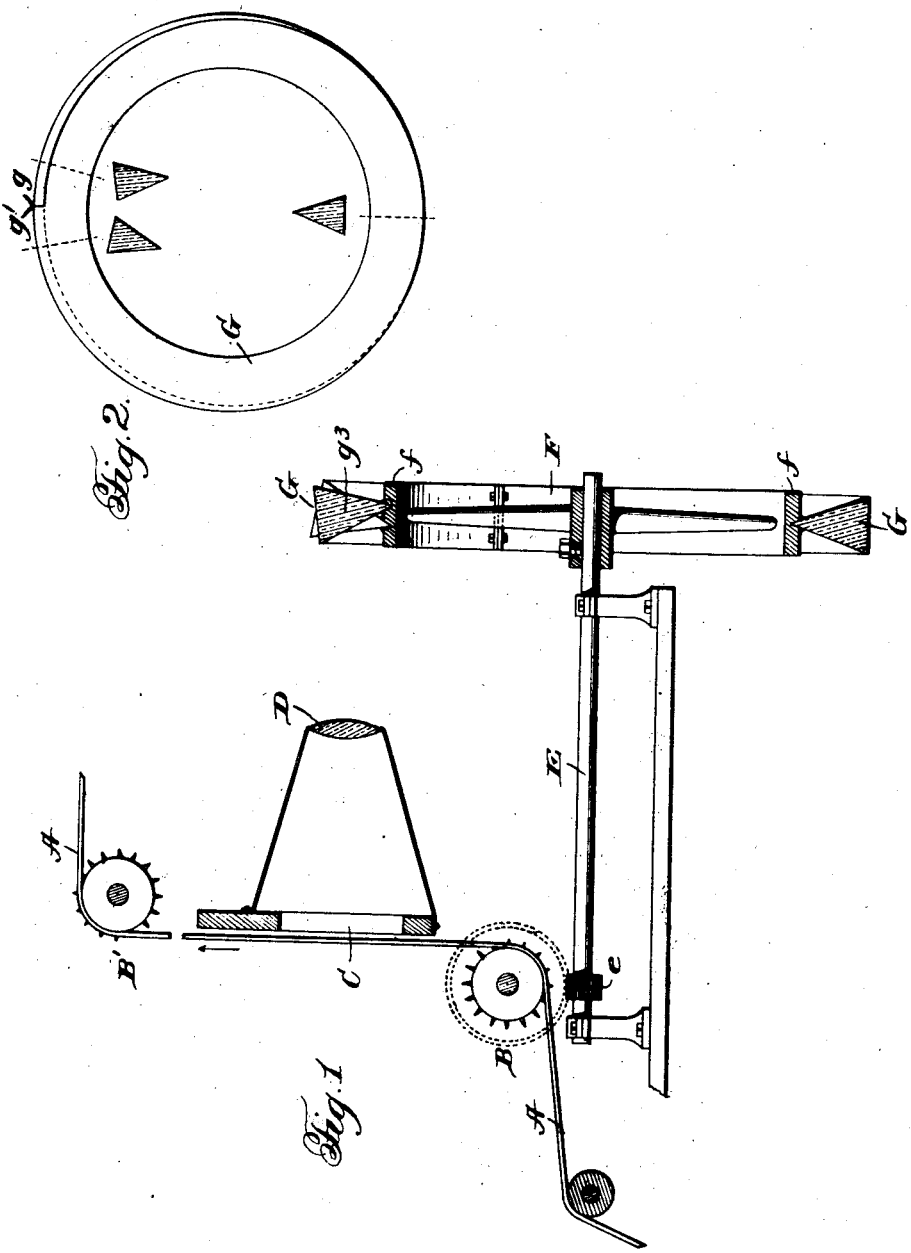

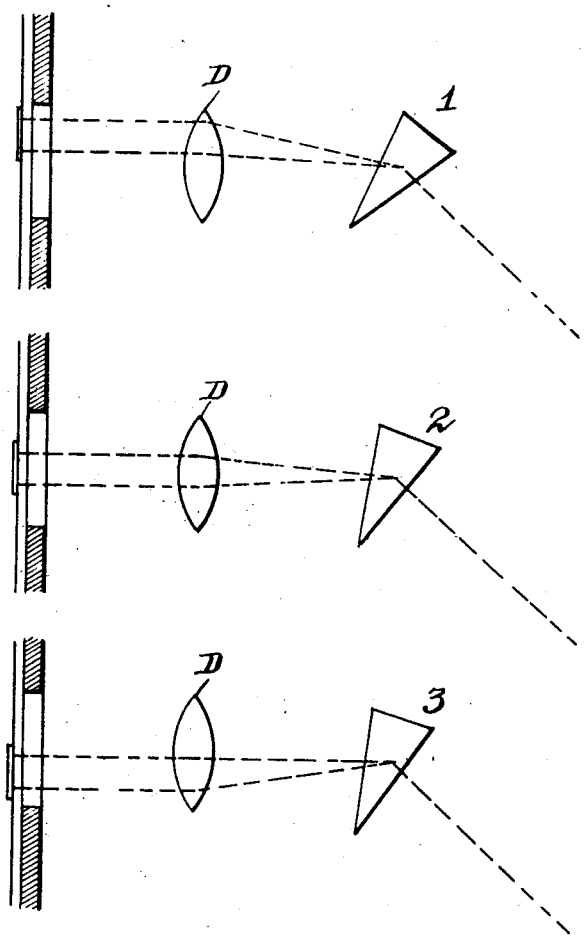

WILLIAM H. SELBY AND FREDERICK A. SELBY, OF MOBERLY, MISSOURI, ASSIGNORS, BY DIRECT AND MESNE ASSIGNMENTS, TO SELBY PATENTS COMPANY, OF KANSAS CITY, MISSOURI, A CORPORATION OF ARIZONA.

MOVING-PICTURE MACHINE.

1,219,403. Specification of Letters Patent. Patented Mar. 13, 1917.

Application filed July 29, 1915. Serial No. 42,644.

*To all whom it may concern:*

Be it known that we, WILLIAM H. SELBY and FREDERICK A. SELBY, citizens of the United States, residing at Moberly, in the county of Randolph and State of Missouri, have invented certain new and useful Improvements in Moving-Picture Machines, of which the following is a specification, reference being had therein to the accompanying drawing.

This invention relates to an improvement in motion picture apparatus, and more particularly pertains to an improvement, the employment of which in its association with a camera or projector, will result in the displaying of the subject or figures on the surface, substantially uniformly under continuous motion as distinguished from intermittent motion.

It is recognized in the art of motion pictures that the avoidance of the so-called "flicker" would be an important accomplishment and numerous efforts have been made with that in view.

Heretofore a changeable prism has been employed or suggested, one of which is illustrated in the patent to Lumiere No. 634560, Oct. 10, 1899. In that patent the so-called prism which is placed in the way of the light rays is so constructed that the angle or tangent may be varied in proportion to the movement of the picture by means of mechanism which is regulated simultaneously with the picture movement.

The present invention comprehends an adjunct or attachment to an apparatus for accomplishing the result suggested in the Lumiere patent with the avoidance of the employment of specially constructed collapsible or changeable prisms, and which will avoid manifest break in the continuity of effective action.

With this object in view, the invention may be stated as comprehending broadly the employment of a single prism of uniform cross section, and associating therewith suitable means for moving the prism in consonance with the movement of the picture or film.

In the accompanying drawings a form embodying the invention is disclosed, but it is to be understood that various changes can be made without departing from the general principle and spirit of the invention.

Figure 1 represents a sectional elevation of a portion of a moving picture machine, showing parts somewhat diagrammatic;

Fig. 2 is an elevation in side view of the prism showing associated therewith the angularity of the parts thereof in section with connecting indicating lines, and, Fig. 3 represents the general diagrammatic position of the prism at its various stages of rotation.

In the drawings, the film is designated at A, operable by suitable mechanism B, and B' to cause the same to move in an upward direction, as indicated by the arrow. Any suitable mechanism may be employed for moving the film past the opening C. In front of the opening is the conventional lens D.

Associated with the mechanism for operating the film is a countershaft E, mounted on a suitable base and driven by a suitable gear connection $e$, from the film driving mechanism. On the outer end of the shaft E is mounted a drum or carrier F, having conveniently a wide periphery $f$ on which is mounted what we will term a continuous prism G. The prism G is formed with a single piece of glass, conveniently and preferably and is slightly spiral, as indicated in Fig. 2, as well as in Fig. 1 in section. The spiral or volute produces upon the movement of the prism variable angles with reference to the plane of the projector.

The diagrammatic various positions of the prism are shown in Fig. 3 wherein 1 represents the starting angle, 2 the medial position as shown in Fig. 2, and 3 the finished or final angle. The rays of light are represented in dotted lines in various positions of projection of the picture being represented at the right, at 4.

In the form of the prism, the starting point is shown at $g$, while the finish point is indicated at $g'$. The circular prism at this point has the same center, as shown at $g^3$, so that the refraction of the light rays is substantially continuous without intermediate jumps or interruptions, the light rays being gradually passed from one end to the other as the points $g$, $g'$, pass the lens. The relative angularity of the different parts of the prism is such as to maintain the proper refraction throughout the upward movement of the picture.

In general operation the prism is located directly in front of the line D and is turned in consonance with the movement of the picture so that the rays of light passing through the picture and lens D are properly straightened progressively from the entry to the exit of the picture in its passage by the window or opening C, as clearly represented in the dotted lines. The prism travels in consonance with the picture strip and as the film bearing the picture reaches the opening or window the prism receives the light rays passing therethrough and the angular relation of that part of the prism which receives these rays is such that the rays are projected upon the screen. The continued movement of the prism and the picture causes different angular portions of the prism to be presented to the light rays whereby these rays are centered upon the screen irrespective of the position of the picture during its passage by the window. In this way it will be seen that when a picture enters the window the prism is at the stationary point G and makes one complete revolution while the picture is passing by the window, so that when a succeeding picture reaches the window the angle of the prism at that time is such that the light rays are centered upon the screen.

To mount the prism on the drum F, any convenient means may be employed, suitable grooves being formed in the periphery of the drum and any known cement or other material used to properly secure the edge of the prism in place.

To locate the prism in the grooves of the drum the drum may be made in any number of sections desired, the sections being united after the prism is in place.

The operation of the machine will be readily understood from the foregoing but may be briefly stated to be that the prism is operated simultaneously with the operation of the film or band of pictures, the angularity of the various surfaces of the prism being presented progressively. This avoids the necessity of the employment of a shutter and maintains the position of the image projected on the screen properly without the so-called objectionable flicker or jump.

Many other advantages will be found to exist in connection with the employment of this device. It may also be employed in connection with the picture producing camera.

Having thus described the invention, what is claimed is:

1. A moving picture machine, including a film supporting means and a source of light, in combination with a prism having a spiral pitch corresponding to the travel of the film adapted to be mounted in front of the film for intercepting and centering the light rays passing therethrough and means for moving the prism and film in consonance.

2. A moving picture machine, including a film supporting means and a source of light, a prism of triangular cross section disposed in front of the film and having a spiral pitch throughout to compensate for the movement of the film for intercepting and centering the light rays passing through the film, and means for moving the prism to correspond with the movement of the film.

3. A moving picture machine, including a film supporting means and a source of light, a continuous integral prism ring arranged in front of the film and having a spiral pitch throughout to correspond to the advancement of the film for intercepting and centering the light rays passing through the film and means for moving the prism to correspond with the advancement of the film.

4. A moving picture machine, a film supporting means and a source of light, a continuous refracting prism having a spiral pitch throughout corresponding to the travel of the film disposed in front of the film for intercepting and centering the light rays passing through the film, and means for moving the prism to correspond with the advancement of the film.

5. In a moving picture machine, a film supporting means, a source of light, a lens, a refracting prism disposed in front of the film, the faces of the prism being disposed at progressively different angles to correspond to the advancement of the film to intercept and center the light rays, and means for moving the film and prism in synchronism.

6. In a moving picture machine, a film supporting means, a source of light, a lens, a refracting prism of triangular cross section throughout disposed in front of the lens for intercepting and centering the light rays, the faces of the prism being disposed at progressively different angles to correspond with the advancement of the film, and means for moving the prism and film in synchronism.

7. In a moving picture machine, a film supporting means carrying a film bearing a series of pictures, means for moving the film, a source of light, a continuous refracting prism arranged in front of the film, means for moving the same in keeping with the travel of a given picture on the film to center the same upon a screen during such travel, the faces of the prism being disposed at progressively different angles to receive and continuously center the on-coming picture as the out-going picture leaves its influence to avoid a flicker between the individual pictures and to insure a visually continuous picture on the screen.

8. The combination with a moving picture mechanism, including a film bearing a series of pictures and means for moving the film, a continuous ring-shaped prism, and means for moving the same in keeping with the travel of a given picture to center the same upon a screen during such travel, said prism having its faces disposed at progressively different angles to receive and project the on-coming picture after the out-going picture leaves its influence to avoid a flicker between the pictures on the film and to insure a visually continuous picture on the screen.

9. The combination with a moving picture mechanism, including a film bearing a series of pictures and means for moving the film, of an annular refracting prism, and means for moving the same in keeping with the travel of a given picture on the film to center the same on a screen during such travel, the prism being formed to receive and project the on-coming picture as the out-going picture leaves its influence to avoid a flicker between the individual pictures and insure a visually continuous picture on a screen.

10. A moving picture machine, including a film supporting means, and a source of light, a lens, a continuous integral ring-shaped prism of triangular cross section disposed in front of the lens for intercepting and centering the light rays passing through the film upon a screen being formed to receive the successive pictures and to avoid a flicker between the individual pictures and insure a visually continuous picture on the screen, and means for moving the film and prism in consonance.

11. A moving picture machine, including a film supporting means, and a source of light, a lens, a continuous ring-shaped prism disposed in front of the lens for intercepting and centering the light rays passing through the film, and means for moving the prism and film in consonance.

In testimony whereof we hereunto affix our signatures.

WILLIAM H. SELBY.
FREDERICK A. SELBY.